United States Patent [19]

Zardiackas

[11] Patent Number: 4,628,449
[45] Date of Patent: Dec. 9, 1986

[54] VECTOR INTERRUPT SYSTEM AND METHOD

[75] Inventor: Fredrick L. Zardiackas, Sunnyvale, Calif.

[73] Assignee: Tandem Computers Incorporated, Cupertino, Calif.

[21] Appl. No.: 551,300

[22] Filed: Nov. 14, 1983

[51] Int. Cl.$^4$ .............................................. G06F 9/46
[52] U.S. Cl. .................................................... 364/200
[58] Field of Search ........................ 364/200 MS File

[56] References Cited

U.S. PATENT DOCUMENTS 4,200,912 4/1980 Harrington et al. ................ 364/200
4,255,786 3/1981 Holtey et al. ...................... 364/200

Primary Examiner—Raulfe B. Zache
Attorney, Agent, or Firm—Lyon & Lyon

[57] ABSTRACT

The disclosure relates to a re-vectoring circuit of a microprocessor system wherein pending interrupts are serviced without unnecessary microprocessor state store and restore operations associated with a return-from-interrupt instruction. At the conclusion of an interrupt service routine, an indirect jump instruction is executed through the same address location of an interrupt vector that the microprocessor indirectly jumped through when the microprocessor was initially interrupted. However, the indirect address is modified, that is, re-vectored to an indirect address within a predetermined address vector depending upon the type of a pending interrupt. The re-vectoring circuit recognizes the indirect jump address and then senses a pending interrupt if there is a pending interrupt. The re-vectoring circuit modifies the indirect address such that a jump occurs to the highest priority pending interrupt service routine. This modification of the indirect address eliminates the store and restore of the microprocessor state in between the servicing of various interrupts.

5 Claims, 2 Drawing Figures

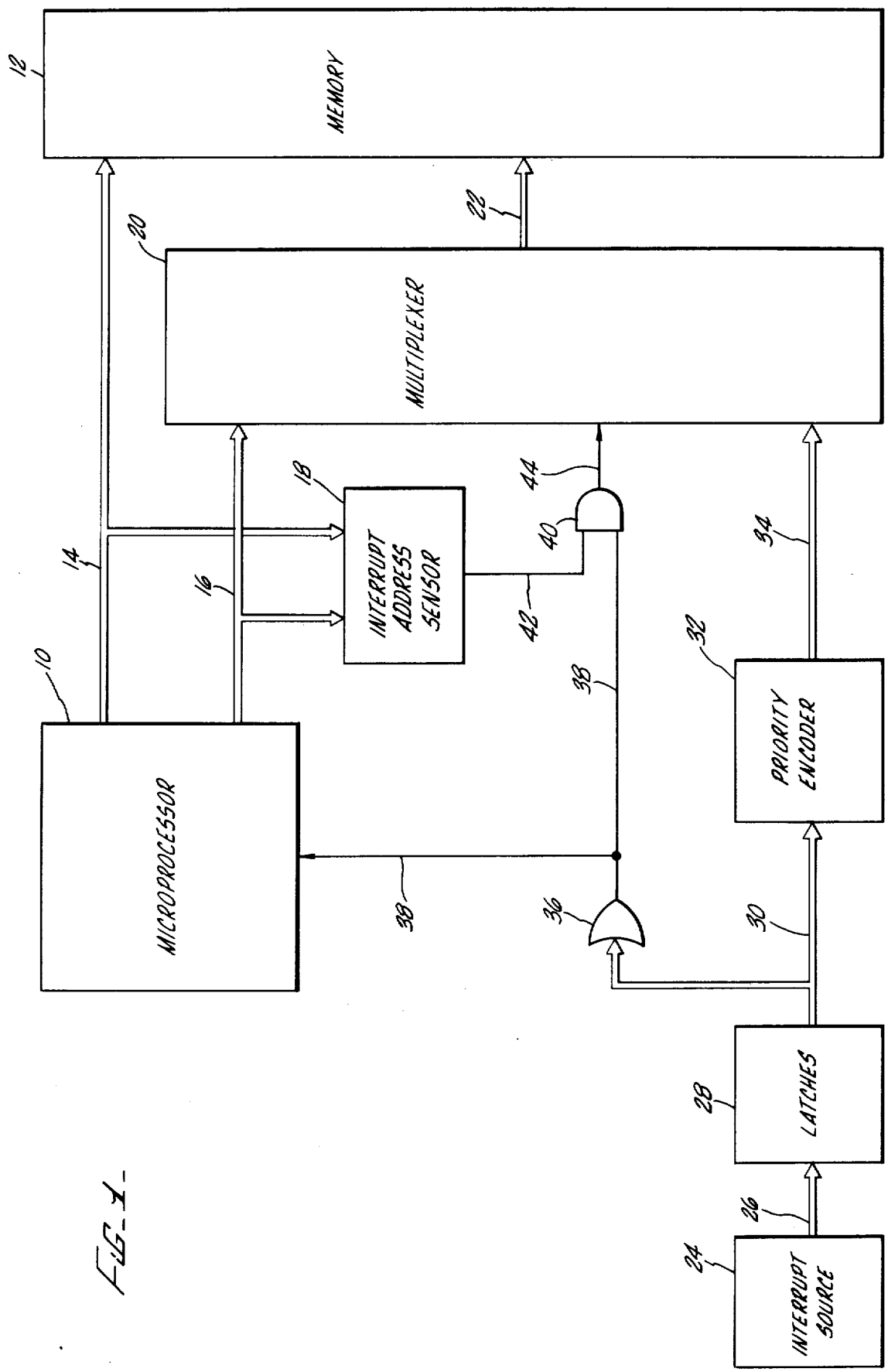

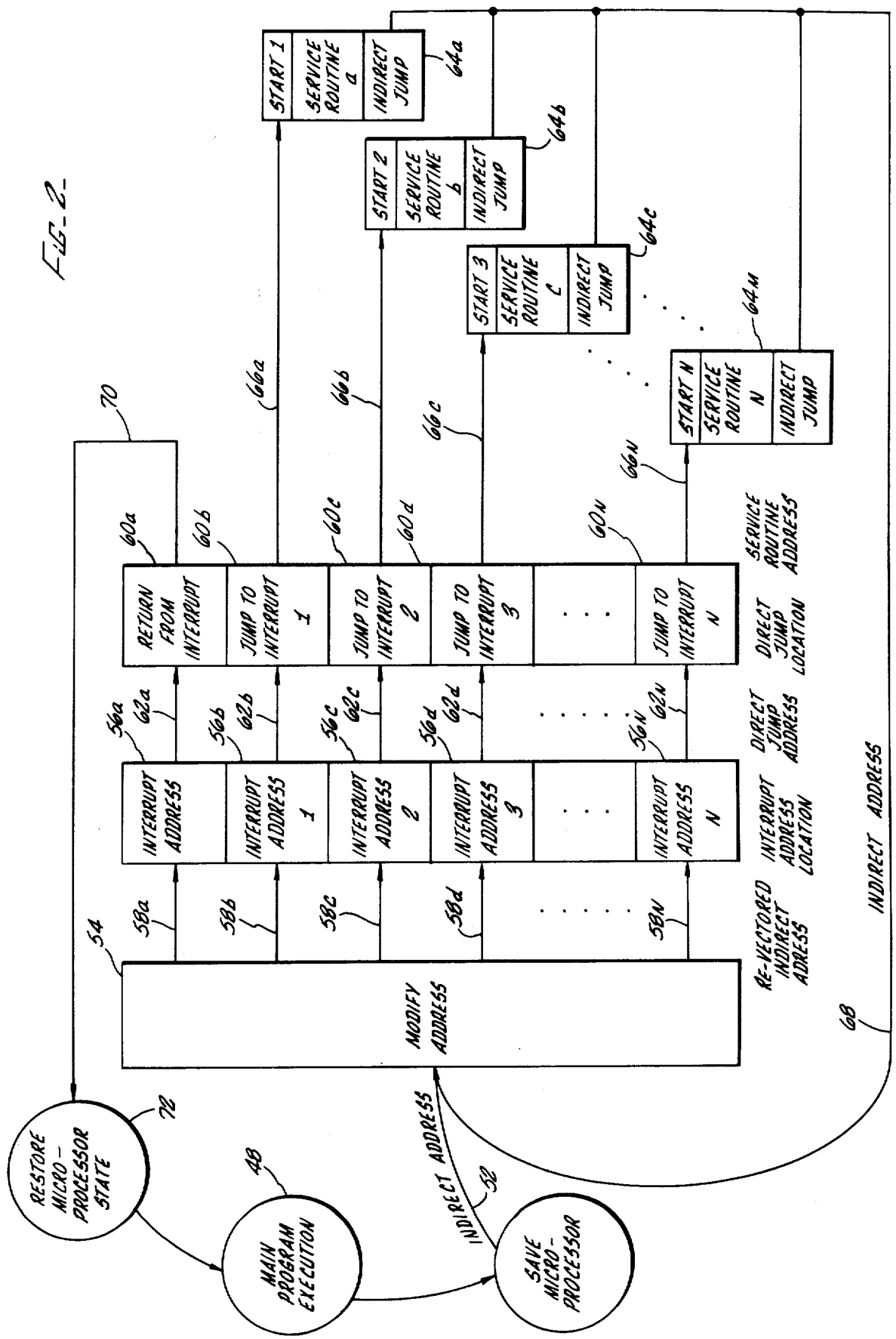

VECTOR INTERRUPT SYSTEM AND METHOD

BACKGROUND

A microprocessor executes a sequence of instructions stored in a memory. The sequence of instructions is often interrupted by urgent requests for service by a corresponding interrupt. These requests are serviced by the execution of their corresponding interrupt service routines. The main program flow that has been interrupted is interrupted at a particular state. The microprocessor must store its state of being prior to entering the service routine and then restore the state of being upon finishing the interrupt service routine. Prior to the initiation of the interrupt service routine, it was interrupted.

The microprocessor disadvantageously stores and restores its state of being in between the execution of a plurality of co-pending interrupt service routines when later multiple interrupts have occurred during the execution of another interrupt service routine. It is wasteful of processing time for the microprocessor to restore and then store its state of being when there are multiple pending interrupts because the microprocessor immediately initiates another pending interrupt service routine after completing the prior service routine.

One way to avoid the wasteful restore and store sequence is to check for the second interrupt in software. The first interrupt service routine examines an interrupt line and determines if there is a pending interrupt. The interrupt service routine would then initiate a second interrupt service routine without the need for a store and restore. This program sequence disadvantageously consumes time and decreases the efficiency of the interrupt service routines.

SUMMARY

It is an object of the present invention to increase the speed of a microprocessor during the servicing of co-pending interrupts. It is another objective of the present invention to improve the efficiency of the service routines by providing an electronic circuit for automatically initiating interrupt service routines.

In a microprocessor system, the microprocessor encounters hardware interrupts which are electronic signals that interrupt the execution of a main program execution. Upon sensing these interrupts, the microprocessor stores its state of being and performs a jump instruction to an interrupt service routine. The manner in which the microprocessor jumps to the service routine varies from microprocessor to microprocessor.

One way of jumping to the service routines is to cause the microprocessor to begin executing instructions starting at a particular service routine address, and this address is stored in another memory location which also has an address that is called an indirect address. This indirect address appends an indirect jump instruction that is executed after the storing of the microprocessor state. Thus, the microprocessor reads the service routine address stored at the indirect address and jumps to the service routine address. This is called indirect addressing. The service routine address to which the microprocessor jumps is the beginning address of the service routine that services a particular interrupt.

Each service routine ends with an indirect jump instruction similar to that executed by the microprocessor upon initial encountering of an interrupt that interrupted the main program. The indirect instruction at the end of the various service routines contains the indirect address and this indirect address is the same indirect address that the microprocessor originally indirectly jumped through. Thus, the same indirect address is used upon interrupting the main program and upon completion of a service routine.

The present invention contemplates the use of an interrupt address sensing circuit which recognizes when either the microprocessor or one of the service routines is performing an indirect jump through the indirect address location. It simply senses a particular indirect address through which the microprocessor or the service routines jump. If this indirect address location is recognized and there is a pending interrupt, a re-vectoring circuit modifies the indirect address to an indirect address within a vector set of interrupt addresses such that program flow indirectly jumps to the then-pending highest-priority interrupt service routine.

Thus, at the conclusion of an interrupt service routine or upon the initial interrupt, an indirect jump instruction is directly executed from which the then-pending highestpriority interrupt service routine is initiated and executed, and if none are then pending, there is a restore and return to main program execution.

Thus, when there is a plurality of co-pending interrupts, the microprocessor advantageously does not restore its state but directly performs an indirect jump to one of the co-pending interrupt service routines. Without the re-vectoring circuit which modifies the service address depending on the type of interrupt, a master service routine that must disadvantageously and initially ascertain type of interrupt that is pending and then jump to and execute a service sub-routine to service the highest-priority then-pending interrupt.

DRAWING DESCRIPTION

FIG. 1 is a schematic diagram of a microprocessor system depicting circuits for address modification.

FIG. 2 is a state diagram depicting the logical flow of a microprocessor with respect to interrupt service routines and a main program execution.

PREFERRED EMBODIMENT

Referring to FIG. 1, the microprocessor 10 which executes micro-instructions stored in a memory 12 is connected to the memory 12 by lines 14 which conduct high order bits of a memory address. Lines 16 conduct low order bits of the memory address. The microprocessor 10 is also connected to an interrupt address sensor 18 by lines 14 and lines 16. The microprocessor 10 is also connected to a multiplexer 20 through lines 16. The microprocessor 10 presents an address comprising the high order bits on lines 14 and low order bits on lines 16. The low order bits on lines 16 are transmitted to the multiplexer 20 which may in turn present those low order bits on to memory 12 lines 22.

The memory 12 is addressed by the high order bits on lines 14 and the low order bits on lines 22. Thus, the microprocessor 10 may be able to present an address on lines 14 and 16 which addresses a particular location in memory 12 through multiplexer 20.

Various circuits in a microprocessor system obtain electronic conditions that are in part the state of the microprocessor system. The various circuits may supply interrupt signals to the microprocessor 10. Such circuits may be conceptualized as an interrupt source 24. The interrupt source 24 supplies a plurality of interrupt signals on lines 26. These interrupt signals are latched into latches 28. The latching of the interrupt signals is used to synchronize the outputs of the latches 28 with the microprocessor 10 as is known in the art.

The latches 28 present outputs on lines 30. Each of the outputs on lines 30 represent a type of interrupt to be serviced. The outputs on lines 30 are arranged in order of service priority. Each of lines 30 references a pending interrupt condition when active. Each referenced pending interrupt requires a service routine to be executed to service the pending interrupt. Thus, for each interrupt condition there is an interrupt line and a corresponding interrupt service routine.

The output of the latches 28 on lines 30 are connected to a priority encoder 32. Priority encoders are well known in the art. The interrupts are in priority depending on a predetermined priority with respect to the other interrupts. The interrupt with the highest priority is the one that is serviced first because it has been predetermined to be more urgent. The priority encoder 32 has outputs which are presented on lines 34. The priority encoder outputs on lines 34 are an encoded binary number depending upon which one of the then co-pending interrupts has the highest priority. For example, assume that interrupts three and five are now pending and five has a higher priority than three, the priority encoder outputs would be one-zero-one which is binary for five.

The priority encoder 32 is connected to the multiplexer 20 by lines 34. The outputs of the latches 28 on lines 30 are connected to an OR gate 36 which has a plurality of inputs each of which is used for signaling the presence of an interrupt. The output of OR gate 36 on a line 38 represents that there is a pending interrupt. Thus, if one or more of lines 30 to OR gate 36 are active, then its output on line 38 becomes active.

The OR gate 36 is connected to an interrupt input of the microprocessor 10 and an and gate 40 through line 38. The pending interrupt signal on line 38 informs the microprocessor 10 that there are one or more pending interrupts.

The AND gate 40 has an input on line 42 which is the output of the interrupt address sensor 18. The output of the AND gate 40 on line 44 becomes active when an indirect address is sensed by the interrupt address sensor 18 and there is a pending interrupt signal on line 38. An active signal on line 44 causes the multiplexer 20 to replace the low order bits on lines 16 with the priority encoded low order bits on lines 34 which are presented to memory 12 on lines 22.

The microprocessor 10 is interrupted from main program execution when the output of OR gate 26 on line 38 becomes active. Thus, an interrupt from the interrupt source 24 on lines 26 is clocked into latches 28 and is presented on lines 30.

The OR gate output on line 38 informs the microprocessor 10 that there is a pending interrupt while enabling the and gate 40. Simultaneously, the priority encoder 32 presents the low order bits on lines 34 depending upon the highest priority interrupt then pending. The microprocessor 10 stores its state upon the recognition of a pending interrupt when exiting the main program execution. The microprocessor 10 then presents the indirect address on lines 14 and 16. This indirect address is then recognized by the interrupt address sensor 18. The AND gate 40 then responds by presenting an active signal on line 44 causing the multiplexer 20 to present the priority encoded low order bits on line 34 to the multiplexer low order bits on lines 22. Thus, the address into the memory 12 is re-vectored depending upon the type of then-pending highest-priority interrupt.

The microprocessor 10 then jumps to and executes the service routine to which it has indirectly jumped. This is accomplished by executing an indirect jump instruction and a direct jump instruction in sequence as is well known in the art. Upon the conclusion of the interrupt service routine and provided there are no other pending interrupts, the service routine causes an indirect jump with the indirect jump address.

If there are no pending interrupts, the multiplexer 20 passes the low order bits on lines 16 through multiplexer 12 to lines 22 so that the indirect jump occurs to the unmodified indirect address. This causes the execution of a return-from-interrupt instruction which causes the restoration of the microprocessor state and the continuation of the main program execution. This occurs at the conclusion of a single interrupt service routine.

However, if there is a pending interrupt when the service routine is completed, then the multiplexer 20 again replaces the low order bits from line 16 with the bits on line 34 and presents them on lines 22 such that the microprocessor 10 indirectly jumps to the next then-pending highest-priority interrupt service routine.

Referring to FIG. 1 and FIG. 2, the microprocessor 10 is executing instructions from a main program 48 and saves its state 50 upon the recognition of a pending interrupt. After saving its state, the microprocessor 10 jumps indirectly in order to execute a service routine. The microprocessor 10 presents the indirect jump address 52 so as to cause the jumping to the service routine. The indirect jump address is revectored 54 depending upon the then pending interrupts. The low order bits of the address are replaced thereby forming revectored addresses 58b, 58c, 58d through 58n. The re-vectored indirect address 58a is the same indirect address 52 that was unchanged when there was no then pending interrupt.

The re-vectored indirect addresses 58b through 58n indirectly point to a service routine. The re-vectored indirect addresses 58 that are presented to the memory 12 point to one of interrupt address locations 56a, 56b, 56c, 56d through 56n. At these interrupt address locations 56 are stored a return-frominterrupt address 62a or direct jump addresses 62b, 62c, 62d through 62n that point to a subsequent return-from-interrupt location 60a or direct jump locations 60b, 60c, 60d through 60n, respectively.

The microprocessor 10 executes the indirect jump instruction which causes the jumping to either the return-frominterrupt location 60a or to one of the direct jump address locations 60b, 60c, 60d through 60n. These return-from-interrupt location 60a and direct jump locations 60b, 60c, 60d through 60n are located at a return-from-interrupt address 62a and direct jump addresses 62b, 62c, 62d through 62n, respectively, of memory 12 and these return-from-interrupt address 62a and the direct jump addresses 62b, 62c, 62d through 62n are stored in interrupt address locations 56a, 56b, 56d through 56n, respectively, and these interrupt address locations are addressed by the re-vectored address 58a, 58b, 58c, 58d, through 58n, respectively.

The direct jump locations 60b, 60c, 60d through 60n store direct jump instructions which cause the microprocessor 10 to jump to one of a plurality of interrupt service routines 64a, 64b, 64c through 64m, respectively. Also stored within each of the jump locations 60b, 60c, 60d through 60n is a service routine address 66a, 66b, 66c, 66d through 66m, respectively, which points to the first address location of their respective service routine 64a, 64b, 64c through 64m.

Upon their completion, the service routines 64 execute an indirect jump instruction which has an indirect jump address 68 that is identical to the indirect jump address 52. This address is also recognized by the interrupt address sensor 18.

And again, the indirect jump address 68 is re-vectored 54 to a re-vectored indirect address 58 which points to a interrupt address location 56 which stores either the returnfrom-interrupt address 62a or one of the direct jump addresses 62b, 62c, 62d through 62n. Address 62a and 62b, 62c, 62d through 62n, respectively, point to either the return-frominterrupt location 60a or one of the indirect jump locations 60b, 60c, 60d through 60n, and locations 60a and 60b, 60c, 60d through 60n store instructions that causes a restoration 70 or the jumping to a service routine 64, respectively.

The microprocessor 10 starts restoration 70 and restores its state 72 when executing the return-from-interrupt instruction stored in the return-from-interrupt location 60a after which the microprocessor 10 then resumes main program execution 48.

It should now become apparent that in the event of a co-pending interrupts, the interrupt service routines 64 are executed in a priority order without the store 72 and the restore 50 until no interrupts are pending. This sequence is 54, 58, 56, 62, 60, 66, 64, 68 back to 54 completing a process loop and this process loop will cycle until there are no longer any pending interrupts. At such time, the re-vectored address 54 is not modified and the unmodified re-vectored address 58a is used to point to the return-from-interrupt instruction stored in the returned-from-interrupt location 60a to enable the restoration 70 and the restore of the microprocessor state 72 such that the main program execution 48 can then be resumed.

This restore of the microprocessor state 72 occurs once for each save of the microprocessor start 50. The save microprocessor state 50 occurs once for each main program execution interruption and not once for each interrupt service routine executed thereby improving the efficiency of the microprocessor system.

It should now become apparent that time savings are realized by not causing the needless storing of the microprocessor state 50 and its subsequent restore of the microprocessor state 72 during consecutive execution of the service routines 64 of their respective co-pending interrupts.

What is claimed is:

1. A microprocessor system for servicing multiple interrupts, including,
    microprocessor means for executing instructions,
    memory means, connected by an address bus to said microprocessor means, for storing instructions and data, and
    circuit means, connected to said microprocessor means and said memory means, for sensing the presence of one or more copending interrupt requests and for servicing a second one of said co-pending interrupt requests directly after servicing a first one of said co-pending interrupt requests without first performing a restore operation followed by a store operation.

2. A microprocessor system of Claim 1 further including:
    interrupt priority encoding means in said circuit means for selecting by a predetermined heirarchy which one of a plurality of co-pending interrupt requests should be serviced first.

3. A microprocessor system for servicing multiple interrupts, including
    microprocessor means for executing instructions,
    memory means, connected by an address bus to said microprocessor means, for storing instructions and data,
    interrupt request sensing means for sensing one or more asserted interrupt request signals having different preassigned priorities, and for indicating the presence of at least one interrupt request,
    interrupt priority encoding means, responsive to said plurality of interrupt request signals, for providing a vector bit field corresponding to the one of said interrupt request signals having the highest preassigned priority,
    interrupt address sensing means for sensing the assertion of an interrupt address by said microprocessor means on said address bus,
    selector means, disposed between said address bus and said memory means and responsive to said interrupt address sensing means, for providing said vector bit field to said memory means in place of at least a portion of said interrupt address in response to said interrupt request sensing means.

4. A method for servicing multiple co-pending interrupts, including the steps of:
    (a) sensing the presence of a first interrupt request,
    (b) temporarily storing the contents of selected CPU registers in designated storage locations,
    (c) asserting an indirect address related to the address of first interrupt service routine for said first interrupt request on an address bus connected to a memory,
    (d) modifying said indirect address by replacing at least a portion of said indirect address with a vector corresponding to said first interrupt request,
    (e) presenting the modified indirect address to the microprocessor memory,
    (f) performing said first interrupt routine,
    (g) jumping to said indirect address after completion of servicing the interrupt routine,
    (h) repeating steps (a) through (g) if a second interrupt request is sensed,
    (i) replacing the temporarily stored register contents if no second interrupt request is sensed.

5. A method for servicing multiple co-pending interrupt, including the steps of:
    (a) sensing the presence of a plurality of interrupt requests,
    (b) determining the priority with which said co-pending interrupt requests are to be serviced,
    (c) temporarily storing the contents of selected CPU registers in designated storage locations,
    (d) inserting an indirect address related to the addresses of interrupt service routines for all possible interrupt requests on an address bus connected to a memory,
    (e) modifying said indirect address by replacing at least a portion of said indirect address with a vector corresponding to the one of said co-pending interrupt requests having the highest priority to form the address of the interrupt service routine relating thereto,
(f) presenting the modified indirect address to said memory,
(g) performing the interrupt service routine corresponding to said pending interrupt request having the highest priority,
(h) jumping to said indirect address after completion of performance of the interrupt routine,
(i) repeating steps (a) through (h) until there are no pending interrupt requests,
(j) replacing the temporarily stored register contents to said selected CPU registers.

* * * * *